(12) United States Patent
Caponetti et al.

(10) Patent No.: US 10,151,301 B2
(45) Date of Patent: Dec. 11, 2018

(54) CONTROL OF WIND TURBINES (71) Applicant: VESTAS WIND SYSTEMS A/S, Aarhus N (DK)

(72) Inventors: Fabio Caponetti, Aarhus C (DK); Martin Ansbjerg Kjær, Harlev J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 298 days.

(21) Appl. No.: 14/762,028

(22) PCT Filed: Jan. 25, 2013

(86) PCT No.: PCT/DK2013/050022
§ 371 (c)(1),
(2) Date: Jul. 20, 2015

(87) PCT Pub. No.: WO2014/114295
PCT Pub. Date: Jul. 31, 2014

(65) Prior Publication Data
US 2015/0322926 A1 Nov. 12, 2015

(51) Int. Cl.
*F03D 11/00* (2006.01)
*F03D 7/04* (2006.01)
(Continued)

(52) U.S. Cl.
CPC .......... *F03D 11/0091* (2013.01); *F03D 7/028* (2013.01); *F03D 7/0276* (2013.01);
(Continued)

(58) Field of Classification Search
CPC .... F03D 7/0276; F03D 11/04; F03D 11/0091; F03D 7/042; F03D 7/028
See application file for complete search history.

(56) References Cited

U.S. PATENT DOCUMENTS

2008/0298964 A1* 12/2008 Rimmen .................. F03D 9/25
416/39
2010/0135793 A1* 6/2010 Krauss ..................... F16N 7/40
416/1
(Continued)

FOREIGN PATENT DOCUMENTS

EP 2309122 A1 4/2011
WO 2009/003478 A2 1/2009
WO WO 2009003478 A2 * 1/2009 ........... F03D 7/0272

OTHER PUBLICATIONS

Hameed Z et al.: "Condition Monitoring and Fault Detection of Wind Turbines and Related Algorithms: A Review", Renewable and Sustainable Energy Reviews, Elseviers Science, New York, NY, US, vol. 13, No. 1, Jan. 1, 2009, pp. 1-39.
(Continued)

*Primary Examiner* — Patrick Maines
(74) *Attorney, Agent, or Firm* — Patterson + Sheridan, LLP (57) ABSTRACT

A method of controlling a wind turbine is described. The method involves forecasting the temperature evolution of a component of the wind turbine based upon the current operating parameters of the wind turbine and upon a required power output; predicting from the temperature forecast a future alarm event caused by the temperature of the component exceeding a first threshold level or falling below a second threshold level; and adjusting the operating parameters of the wind turbine to control the temperature evolution of the component thereby to avoid or delay the predicted alarm event.

22 Claims, 7 Drawing Sheets

(51) Int. Cl.
*F03D 7/02* (2006.01)
*F03D 17/00* (2016.01)
*F03D 13/20* (2016.01)

(52) U.S. Cl.
CPC .......... *F03D 7/042* (2013.01); *F03D 7/045* (2013.01); *F03D 13/20* (2016.05); *F03D 17/00* (2016.05); *F05B 2260/821* (2013.01); *F05B 2270/1091* (2013.01); *F05B 2270/3032* (2013.01); *F05B 2270/404* (2013.01); *Y02E 10/723* (2013.01)

(56) References Cited

U.S. PATENT DOCUMENTS

| | | | | |
|---|---|---|---|---|
| 2010/0270798 A1* | 10/2010 | Poulsen | ............... | F03D 7/0224 290/44 |
| 2011/0080001 A1* | 4/2011 | Gundtoft | ............... | F03D 7/028 290/44 |
| 2011/0140433 A1* | 6/2011 | Miranda | ............... | F03D 7/0276 290/44 |
| 2011/0221194 A1* | 9/2011 | Egedal | ............... | F03D 7/0224 290/44 |
| 2012/0143565 A1* | 6/2012 | Graham, III | ............ | F03D 17/00 702/181 |
| 2012/0148407 A1* | 6/2012 | Akashi | ............... | F03D 80/60 416/95 |
| 2013/0136595 A1* | 5/2013 | Laurberg | ............... | F03D 7/00 416/1 |
| 2014/0015252 A1* | 1/2014 | Zhu | ............... | F03D 7/0288 290/44 |

OTHER PUBLICATIONS

Zaher A S et al.: "A Multi-Agent Fault Detection System for Wind Turbine Defect Recognition and Diagnosis", Power Tech, 2007 IEEE Lausanne, IEEE, Piscataway, NJ, USA, Jul. 1, 2007, pp. 22-27.

International Search Report for PCT/DK2013/050022, dated Oct. 7, 2013.

* cited by examiner

A. - Estimated time to alarm
B. - Feedback information

CONTROL OF WIND TURBINES

TECHNICAL FIELD

The present invention relates to the control of wind turbines, and in particular to a control method and a control system for increasing the availability and yield of a wind turbine.

BACKGROUND

The availability of a wind turbine is a measure of its ability to produce power when both the wind turbine and the grid are healthy and while ambient conditions are suitable, e.g. when wind speed is above the cut-in limit and below the cut-out limit. Availability is expressed as a percentage of uptime per turbine per year, for example 99% availability represents almost four days of lost production per year.

For cost-effective energy production, it is necessary to maximise the availability of wind turbines by minimising downtime. Wind turbines are complicated power plants and include various safety systems designed to protect the wind turbine from damage during adverse operating conditions. For example, wind turbines are designed to cut-out above a certain wind speed to avoid excessive loads acting on the blades and the tower.

Wind turbines also have a number of sensors for monitoring the temperature of various components, for example the generator, the gear oil and the hydraulic oil of the pitch control system. If the temperature of one of these components exceeds a predetermined threshold, then the wind turbine may be designed to de-rate (i.e. reduce its power output), or shut down completely. De-rating the wind turbine reduces the demand on the wind turbine in terms of power and/or speed and has the effect of stabilising or reducing the temperature of the components.

Wind turbines include cooling systems for controlling the temperature of temperature-critical components. For example, the gear oil is cooled by circulating it through a water-cooled heat exchanger. Wind turbines also typically have fans inside the nacelle for cooling the water in the heat exchanger and for cooling other temperature-sensitive components inside the nacelle. The fans are activated when the ambient temperature exceeds a predetermined threshold or if the temperature of the gear oil exceeds a predetermined threshold. If the cooling effect of the fans is not sufficient to maintain the temperatures below a safe operating level, then the wind turbine may need to be de-rated or shut-down. Equally, the wind turbine may need to be de-rated or shut down if there is a failure in any of the cooling systems causing the temperature of the critical components to exceed a predetermined safe operating level.

Wind turbines also include heaters for increasing the temperature of temperature-sensitive components in cold conditions and for maintaining the temperature of those components at the required level for effective operation. If the temperature of the components falls below a threshold, then start-up may be prevented and/or this may prevent the wind turbine from operating at its maximum power output level.

In order to maximise the availability of a wind turbine, the control systems of the wind turbine are generally designed to de-rate the wind turbine in response to an alarm event in preference to shutting the wind turbine down. An example of a power de-rate scenario of a wind turbine is described below with reference to FIG. 1. Specifically, the example shows how the turbine power is modulated as a function of the temperature of the gear oil in order to avoid a complete shut down of the turbine when the gear oil temperature becomes too high.

Figure 1:
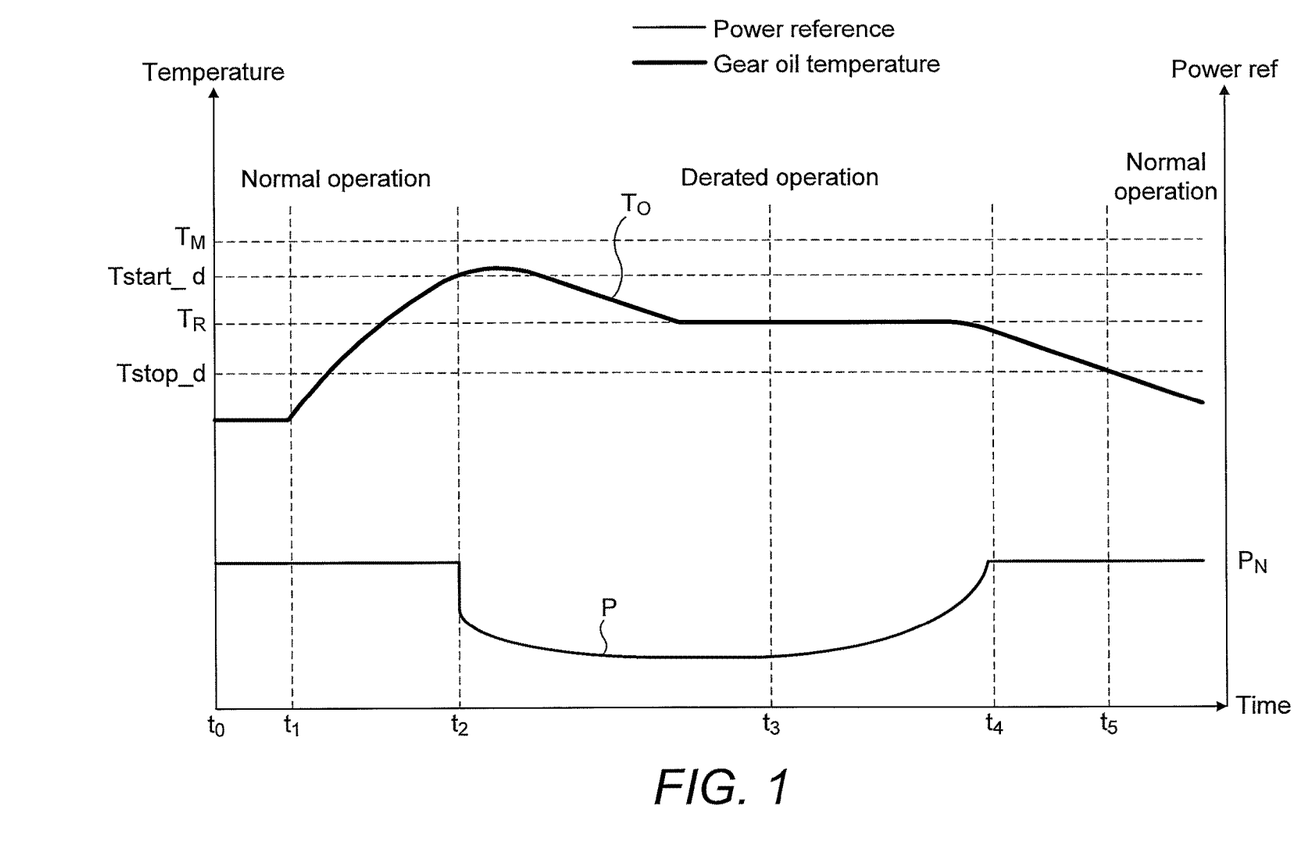
FIG. 1 which shows a power de-rate scenario in case of failure of the gear oil cooling system has already been described above by way of background to the present invention.

FIG. 1 is a plot of both the gear oil temperature $T_O$ and the power reference P versus time. Referring to FIG. 1, from time $t_0$ to time $t_2$, the wind turbine is operating normally. The turbine power P is at a nominal power level $P_N$ and the gear oil temperature $T_O$ is at a safe operating level. At time $t_1$, there is a failure of the gear oil cooling system, which causes the gear oil temperature $T_O$ to increase steadily. At time $t_2$, the gear oil temperature $T_O$ increases above a threshold safety level $T_{start\_d}$, triggering an alarm event. The threshold safety temperature level $T_{start\_d}$ is slightly below a maximum gear oil temperature $T_M$ above which safe operation cannot be guaranteed. The alarm event signals to the wind turbine controller to de-rate the wind turbine, i.e. to operate at a reduced power output.

There is a correlation between power output and rotational speed and gear oil temperature, i.e. gear oil temperature $T_O$ is proportional to power output and to rotational speed, when all other factors are kept constant. Once the alarm event is triggered, the wind turbine is operated at a de-rated power that maintains the gear oil temperature $T_O$ at a reference level $T_R$. At time $t_3$, the cooling system is back online and working normally. From time $t_3$ to time $t_4$ the power output P is able to increase whilst the cooling system maintains the gear oil at the reference temperature $T_R$. At time $t_4$ the power output P has returned to the nominal power level $P_N$ and the gear oil temperature $T_O$ falls steadily. At time $t_5$, the gear oil temperature $T_O$ falls below a threshold temperature $T_{stop\_d}$ at which point the wind turbine stops de-rated operation and returns to normal operation.

De-rating the wind turbine as described above in the event of an alarm is preferable to a total shut down because it allows the wind turbine to continue to operate once an alarm event is triggered, albeit at a reduced power level, thereby increasing the availability of the wind turbine.

If one of the temperature sensors or other sensors of the control system should fail, then incorrect data may be passed back to the controller, and the controller may take action to shut down the wind turbine unnecessarily due to an alarm event being triggered on the basis of spurious sensor data.

To avoid this problem, the applicant's co-pending PCT application WO2012/025121 describes a system for controlling a wind turbine on the basis of a theoretical state of the wind turbine if a sensor is determined to be faulty. For example, the control system is able to estimate the temperature of critical components such as the gear oil on the basis of other operating parameters, for example rotor speed, ambient temperature etc. If the sensor data is found to disagree significantly with the estimated temperature, then the sensor is deemed to be faulty, and the wind turbine is controlled on the basis of the estimated temperature values. This control method reduces the likelihood of the wind turbine being shut down or operated incorrectly if a sensor fails and hence increases the availability of the wind turbine.

It is desirable for wind turbines to be able to increase their yield (i.e. power output) wherever possible, for example to compensate for another wind turbine in the wind farm being shut down or if the grid operator demands a power boost. However, this may create a problem when the wind turbine is already operating close to its maximum temperature limits (e.g. in high ambient temperatures, and at high power outputs) because it may trigger an alarm event leading to the wind turbine being de-rated or shut down completely. As already described above, shutting down the wind turbine is undesirable at any time, but it is especially undesirable for a de-rate or shutdown to occur at the time when a power boost is required.

Against this background, the present invention aims to increase the availability of a wind turbine during varying operating conditions. The present invention also aims to provide a control strategy capable of responding to a power boost demand, particularly when the wind turbine is already operating close to its temperature limits.

SUMMARY OF THE INVENTION

According to the present invention there is provided a method of controlling a wind turbine, the method comprising: (a) forecasting the temperature evolution of a component of the wind turbine based upon the current operating parameters of the wind turbine and based upon a required power output; (b) predicting from the temperature forecast a future alarm event caused by the temperature of the component exceeding a first threshold level or falling below a second threshold level; and (c) adjusting the operating parameters of the wind turbine to control the temperature evolution of the component thereby to avoid or delay the predicted alarm event.

The component may be the gear oil, the hydraulic fluid, the converter, the water cooling system and/or one or more phases of the generator. The component is rated for safe operation at temperatures between the first and second thresholds. Preferably the method involves forecasting the temperature evolution of a plurality of components.

By forecasting the temperature evolution of the component(s) proactive action can be taken to maintain the temperature of the component at a suitable level to ensure that the wind turbine can operate normally at the required power output level and/or accommodate requests for a power boost without triggering any alarm events.

For example, if it is predicted that the temperature of the component may exceed the first threshold level at a future point in time, then cooling systems associated with the component can be activated or overrated ahead of that future point in time to prevent or delay an alarm event. This increases the availability of the wind turbine and allows it to continue to operate normally, whereas if proactive steps are not taken the wind turbine may otherwise need to be de-rated or shut down.

Conversely, in low temperatures, there is a risk that the temperature of the component may fall below the second threshold level, where it would be too cold to guarantee safe operation. For example, if the temperature of the gear oil becomes too low, then its viscosity may be too high to provide effective lubrication. Accordingly, if it is predicted that the temperature of the component may fall below the second threshold level at a future point in time, then heating systems associated with the component can be activated or overrated ahead of that future point in time to prevent or delay an alarm event.

Alternatively or additionally, the method may comprise adjusting rotor speed, torque or otherwise adjusting the power output of the wind turbine before the predicted alarm event. Power is the product of speed and torque, and so adjusting only one of these parameters will lead to a variation in power, whilst it is possible to adjust both parameters simultaneously in such a way that power remains constant. In terms of thermal behaviour, the component(s) may respond to variations in torque differently to variations in rotor speed. Accordingly, it is possible to select suitable values for torque and rotor speed that are least likely to trigger a future alarm event, but still result in the required power level.

The method is particularly advantageous when the wind turbine needs to be overrated, for example in order to compensate for another wind turbine in the wind farm being shut down or otherwise to satisfy a request for a power boost by the grid operator. In this regard, step (a) of the method may comprise forecasting the effect of a demanded increase in the power output of the wind turbine upon the temperature evolution of the component. If it is predicted in step (b) that overrating the wind turbine is likely to trigger an alarm event, then proactive steps (such as those already mentioned above) can be taken to avoid or delay the alarm event.

If a power boost is required, then it is possible to increase either the rotor speed or the torque, or both. It was described above that the temperature behaviour of the components is different for variations in torque than for variations in rotor speed. Accordingly, the method may comprise choosing between different overrating strategies or otherwise determining an overrating strategy that is least likely to result in an alarm event being triggered.

Hence, the method may comprise forecasting the effect upon the temperature evolution of the component of first and second overrating strategies for achieving the demanded increase in power, wherein the first overrating strategy involves increasing rotor speed and the second overrating strategy involves increasing torque, and selecting the overrating strategy that is least likely to trigger a future alarm event.

The method may comprise determining a maximum 'safe' overrated power at which the wind turbine can operate without triggering a future alarm event. If the demanded power boost is above this level, then the method may involve saturating the power boost command to the maximum 'safe' level, thereby guaranteeing continuous operation. Using this approach it may also be possible to avoid the need to activate or overrate the cooling systems.

The current operating parameters of the wind turbine may include measured temperature values. Most wind turbines include sensors for measuring the ambient temperature outside the nacelle and for measuring the temperature inside the nacelle. The wind turbine may also include temperature sensors for measuring the temperature of the cooling water, hydraulic fluid and lubricating oils.

Alternatively, or additionally, the current operating parameters may include estimated temperature values. It was described above by way of background that applicant's co-pending application WO2012/025121 describes methods for operating a wind turbine on the basis of a theoretical state of the wind turbine. This is particularly useful when a sensor is found to be faulty. For example, if the temperature sensor for measuring the temperature of the cooling water is found to be faulty, the temperature of the cooling water can be estimated from other operating parameters such as the measured temperatures inside and outside of the nacelle, the power set point, and from known heat transfer relationships between various components of the system based upon Newton's laws of cooling. Alternatively, or additionally, if a sensor was found to be faulty, sensor data from other wind turbines located in the same wind farm could be used in place of the information from the faulty sensor.

The invention also provides a wind turbine control system comprising a production controller and a plurality of control modules for controlling the operation of a plurality of wind turbine components, the production controller being configured to calculate a power reference and a speed reference for operating the wind turbine components on the basis of measured parameters such as wind speed and the temperature of the wind turbine components, wherein the system is configured to: (a) forecast the temperature evolution of one or more of the wind turbine components on the basis of the operating parameters and on the basis of a required power output, (b) predict from the temperature forecast a future alarm event caused by the temperature of a component exceeding a first threshold level or falling below a second threshold level, and (c) adjust the operating parameters of the wind turbine to control the temperature evolution of the component thereby to avoid or delay the predicted alarm event.

The production controller may calculate the temperature forecast. However, the control system preferably comprises a temperature observer module arranged to receive operating parameters of the wind turbine and to forecast the temperature evolution of the one or more wind turbine components on the basis of those operating parameters. The temperature observer module may be configured to receive information indicative of the temperature of the wind turbine components and to receive the power reference and the speed reference determined by the production controller. Alternatively or additionally, the temperature observer module may receive estimates of the temperatures of one or more of the wind turbine components. The value of estimated parameters has already been explained above.

The temperature observer module may be configured to receive a status signal from the converter module. This status signal may include an indication of the available active and reactive power that the converter module is capable of delivering given its current status (temperature) and the grid status (voltage and frequency). This value can be used to determine the maximum power reference above rated power at which the turbine would be able to operate without triggering an alarm event in connection with the thermal loading of the converter module. This maximum power reference can then be used in place of a power boost command if the power boost command is predicted to cause the temperature of the converter module to rise above the first threshold level.

The control system is preferably configured to operate one or more heating or cooling systems of the wind turbine prior to the predicted alarm event occurring in order to avoid or delay the predicted alarm event. The temperature observer module is preferably configured to control the wind turbine heating and cooling systems directly.

The temperature observer module includes a suitable controller and can be readily integrated within existing wind turbine control systems (either at the time of production of the wind turbine or it can be retrofitted to an existing wind turbine) to receive operating parameters from the production controller and temperature data from the various wind turbine control modules associated with the various turbine components. From this information, the temperature observer module can forecast the temperature evolution of the various components and predict alarm events on the horizon. By directly associating the temperature observer module with auxiliary heating and cooling systems, the temperature observer module can proactively activate those systems or increase the levels of heating or cooling ahead of a predicted alarm event in order to avoid the alarm event from occurring. This increases the availability of the wind turbine.

The invention is particularly beneficial in high ambient temperatures and when the wind turbine is operating at maximum power as in such cases the various components may be operating close to their maximum temperatures. Whereas existing control systems may not be able to accommodate a power boost request in such circumstances, the present invention allows such requests to be accommodated through proactive control of the auxiliary cooling systems and/or by saturating a power boost command to a 'safe' level at which future alarm events are not predicted to occur, as already described above.

The invention is also advantageous in cold conditions where it is possible to forecast drops in temperature due to severe low temperature regimes and activate heating systems before an alarm event is predicted to occur.

The inventive concept includes a wind turbine comprising a control system as described above, and a wind farm comprising a plurality of such wind turbines.

It will be appreciated that optional features described above in relation to the method aspect of the invention apply equally to the invention when expressed in terms of a system, and hence repetition of those features has been avoided where possible. Similarly, the optional features described above in relation to the system also apply to the invention when expressed in terms of a method.

BRIEF DESCRIPTION OF THE DRAWINGS

In order that the invention may be more readily understood, examples of the invention will now be described with reference to the following drawings, in which.

DETAILED DESCRIPTION

Figure 2:
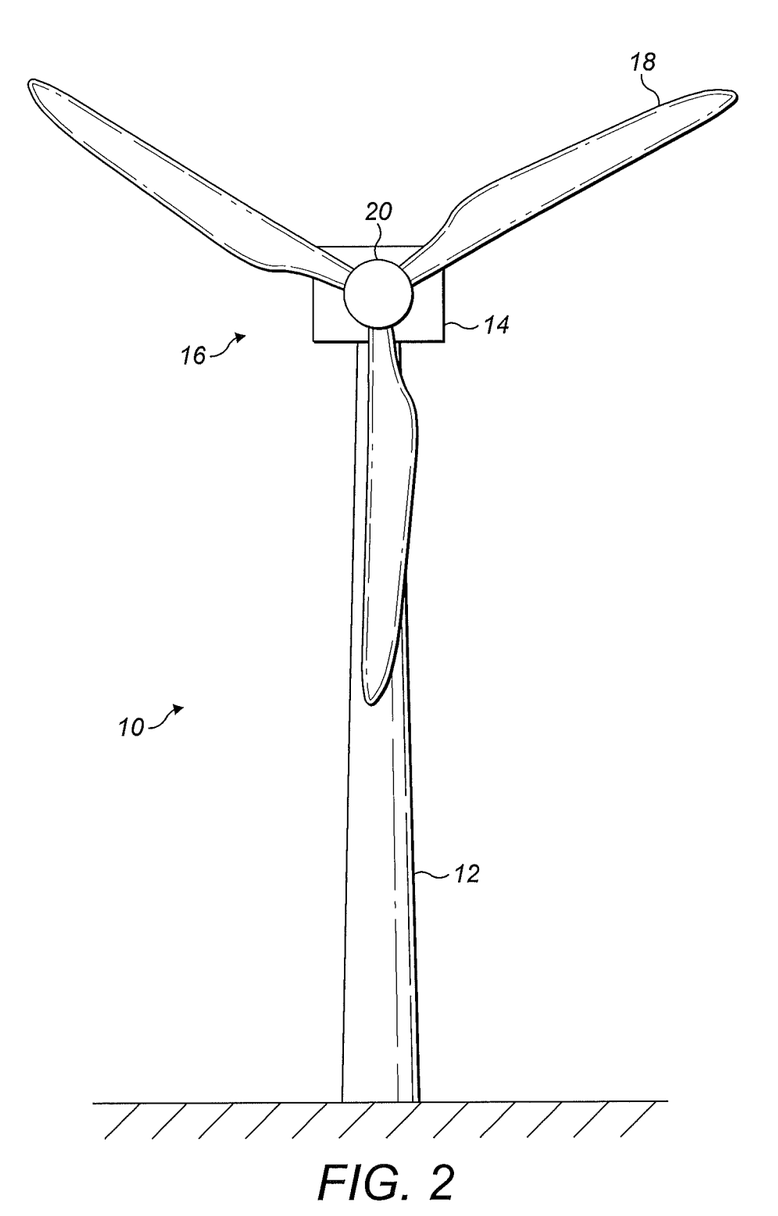
FIG. 2 shows a wind turbine in accordance with an embodiment of the present invention.

FIG. 2 shows a wind turbine 10 according to an embodiment of the present invention. The wind turbine 10 comprises a tower 12 supporting a nacelle 14 at its upper end. A rotor 16 is mounted to the nacelle 14. The rotor 16 comprises three rotor blades 18, which extend from a central hub 20. A plurality of actuators (not shown) are located inside the hub 20. The actuators are part of a pitch control system, and are configured to turn the blades 18 about their respective longitudinal axes in order to control the rotational speed of the rotor 16 depending upon the wind conditions and power demand. In this example the actuators are hydraulically operated, although in other examples the actuators may be operated by other means, for example electrically.

Figure 8:
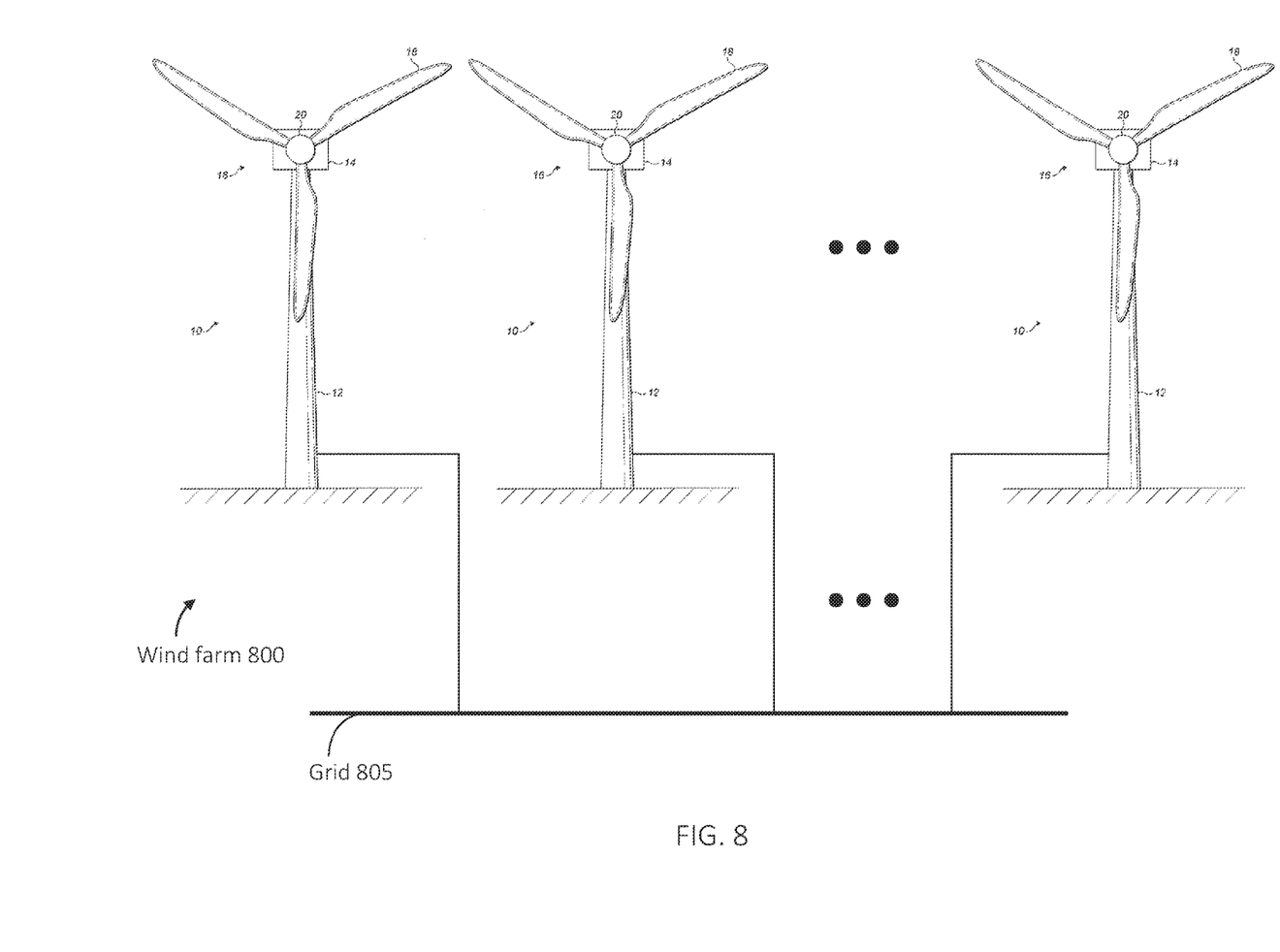
FIG. 8 illustrates a wind farm comprising a plurality of wind turbines.

FIG. 8 illustrates a wind farm 800 comprising a plurality of wind turbines 10 coupled with a grid 805.

Figure 3:
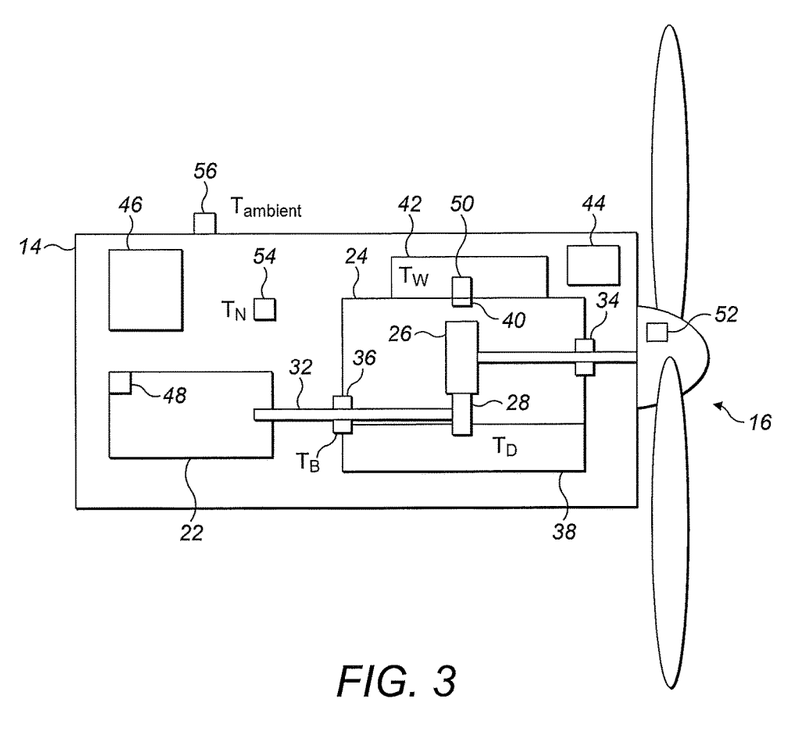
FIG. 3 is a schematic representation of the nacelle and rotor of the wind turbine shown in FIG. 2.

FIG. 3 is a simplified schematic representation of the nacelle 14 and rotor 16. Referring to FIG. 3, the nacelle 14 houses a generator 22 and a gearbox 24. A low speed gear 26 intermeshes with a high speed gear 28 inside the gearbox 24. The low speed gear 26 is mounted at one end of a low speed shaft 30, and the rotor 16 is mounted at the other end of the said shaft 30. The high speed gear 28 is mounted on one end of a high speed shaft 32 and the other end of the high speed shaft 32 connects to the generator 22, which converts the rotational energy of the high speed shaft 32 to electrical energy. The gearbox 24 includes a low speed bearing 34 for supporting the low speed shaft 30 and a high speed bearing 36 for supporting the high speed shaft 32.

The gearbox 24 further includes an oil sump 38 containing gear oil, in which the high-speed gear 28 and the high speed bearing 36 are shown partially immersed. An oil inlet 40 is located at the top of the gearbox 24. The nacelle 14 also houses a number of auxiliary cooling systems. In this example, there is shown a water-cooled heat exchanger 42 associated with the gearbox 24 for cooling the gear oil, and one or more fans 44 for cooling the air inside the nacelle 14.

One or more controllers 46 for controlling the wind turbine 10 are also located inside the nacelle 14. The controllers 46 receive input signals from a plurality of sensors associated with the various components. In this example, a plurality of first temperature sensors 48 are configured to sense the respective temperatures of the three phases of the generator 22; a second temperature sensor 50 is configured to sense the temperature $T_W$ of the cooling water of the heat exchanger 42; a third temperature sensor 52 is configured to sense the temperature of the hydraulic fluid of the pitch control system; a fourth sensor 54 is configured to sense the temperature $T_N$ of the air inside the nacelle; and a fifth sensor 56 is configured to sense the temperature $T_{ambient}$ of the ambient air outside the nacelle.

It should be appreciated that FIG. 3 is a simplified representation of the nacelle 14. In reality there would be more components inside the nacelle 14 and the components may be configured differently. For example, the gearbox 24 may comprise any suitable number and arrangement of gears or it might have a dry sump, where the oil is pumped over the gears before being collected in a main tank where it is filtered and cooled.

Figure 4:
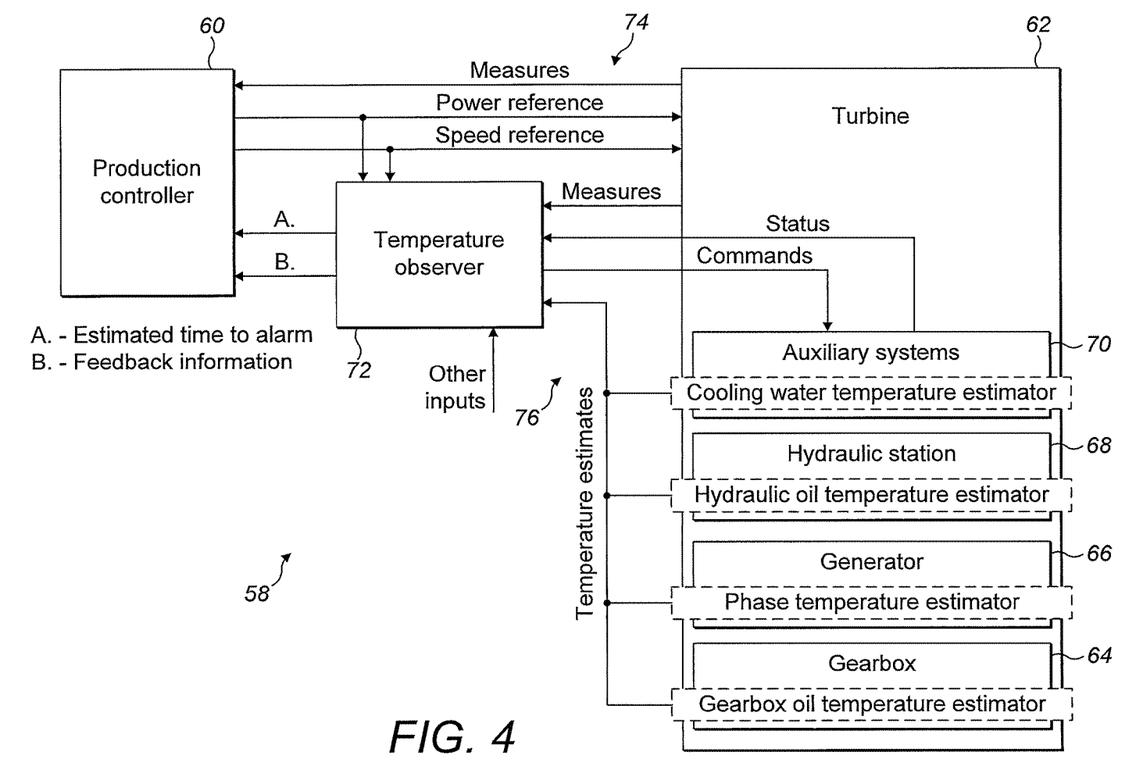
FIG. 4 is a schematic representation of a wind turbine control system for controlling the wind turbine of FIG. 2.

FIG. 4 is a schematic representation of a wind turbine control system 58 for controlling the wind turbine 10 of FIG. 2. The control system 58 comprises a production controller 60 and a turbine controller 62. The turbine controller 62 in turn comprises a plurality of turbine control modules 64, 66, 68, 70 associated respectively with the gearbox, the generator, the hydraulic fluid of the pitch control system, and the auxiliary cooling systems such as the heat exchanger and the fans mentioned above. The production controller 60 and the turbine controller 62 are configured to communicate directly, and indirectly via a temperature observer module 72. The temperature observer module 72 is a novel feature of the control system of the present invention, and its operation will be described in more detail later.

The various turbine control modules 64-70 each include a respective temperature sensor and a respective temperature estimator. As mentioned above, the temperature sensors are configured to measure the temperature of the components with which they are associated. The measured temperature of the components is communicated to the production controller 60 via the turbine controller 62 across a data bus 74.

The temperature estimators are configured to estimate the temperature of their associated components based upon the operating parameters of the wind turbine, the ambient conditions and from thermodynamic relationships. An example of the gear oil temperature estimator is described in detail later, and further details of the temperature estimators can be found in applicant's co-pending patent application WO2012/025121, which was described above by way of background to the present invention.

As is well known in the art, the production controller 60 determines a power reference and a speed reference for operating the wind turbine on the basis of a demanded power and measured external parameters such as wind speed. The power reference and the speed reference are communicated to the turbine controller across the data bus 74, which operates the various turbine components in accordance with predetermined control strategies in order to follow the speed reference and power reference values set by the production controller 60.

If the temperature of the gearbox, generator or hydraulic fluid exceeds a predetermined threshold level, then an alarm event is generated. In response to the alarm event, the production controller 60 determines a de-rated mode of operation by reducing the power reference and/or the speed reference provided to the turbine controller 62. If de-rating the turbine is not sufficient to reduce the temperature of the component(s) to a safe level, then the production controller 60 may take action to shut down the wind turbine.

The temperature observer module 72 of the present invention is concerned with increasing the availability of the wind turbine by predicting the possibility of an alarm event occurring in the future and taking proactive steps to avoid or delay the alarm event occurring. The temperature measurements from the turbine controller 62 and the estimated temperature values from the various turbine control modules 64-70 are communicated to the temperature observer module 72 via a data bus 76. The temperature observer module 72 also receives the power reference and the speed reference from the production controller 60, and other inputs such as the ambient air temperature $T_{ambient}$ and the temperature $T_N$ inside the nacelle 14. The temperature observer module 72 is also connected to the auxiliary cooling systems 70 and is configured to receive the current status of the auxiliary cooling systems and to control the auxiliary cooling systems as described further below.

Based upon the temperature measurements from the various control modules 64-70, the temperature observer module 72 forecasts the temperature evolution of the gearbox, the various generator phases, the hydraulic fluid, the converter and any other temperature-critical components and determines if an alarm event is likely to occur at a future time. The temperature observer module 72 communicates the temperature evolution forecast to the production controller 60 together with the estimated time to alarm. If the temperature observer module 72 determines that an alarm event is likely to occur in the future, it may take proactive action to prevent the alarm event from occurring, for example by controlling heating or cooling systems and/or adjusting rotor speed or torque. This guarantees continuous operation of the wind turbine in both cold and hot ambient conditions and enables the wind turbine to be overrated without triggering alarm events. An example will now be described with reference to FIGS. 5 and 6.

Figure 5:
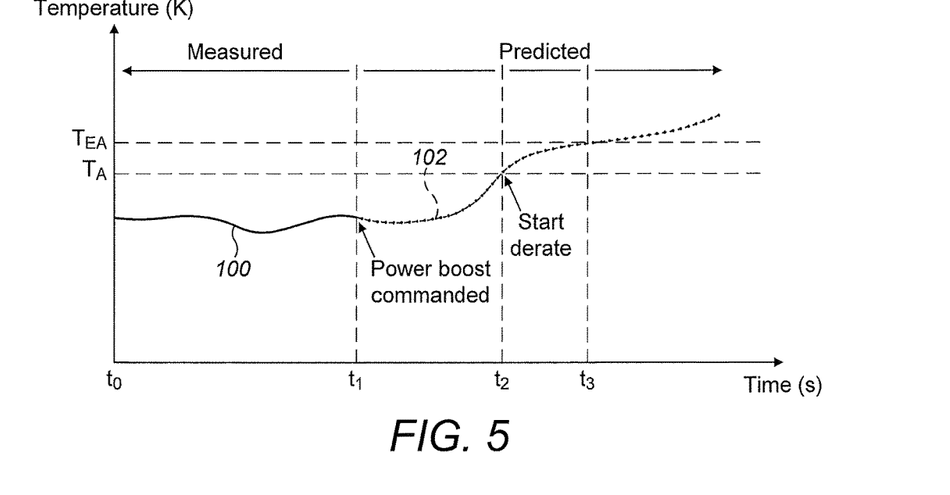
FIG. 5 is a plot of the temperature evolution of a wind turbine component showing the situation when a demanded power boost triggers an alarm event.

FIG. 5 is a plot of the temperature of a wind turbine component versus time. The component may be the generator, the gear oil or the hydraulic fluid for example. The solid line 100 between time $t_0$ and time $t_1$ shows the measured temperature of the component obtained from the sensor readings, whilst the dotted line 102 from time $t_1$ onwards shows the estimated temperature evolution of the component determined by the temperature observer module 72.

From time $t_0$ to $t_1$ the wind turbine is operating normally and the measured temperature of the component is below an alarm threshold temperature $T_A$. At time $t_1$, a power boost is demanded by the grid operator and the production controller 60 calculates an increased power reference value. Based upon the increased power reference value and the current operating parameters of the wind turbine, the temperature observer module 72 calculates a predicted temperature evolution of the component (dotted line 102), which is also referred to herein as a temperature 'forecast'.

From the temperature forecast, the temperature observer module 72 predicts that the temperature of the component will reach the alarm threshold temperature $T_A$ at a future time $t_2$. In practice, once the alarm threshold temperature $T_A$ is reached, the production controller 60 starts to de-rate the wind turbine. The temperature observer module 72 factors this predicted de-rated operation following time $t_2$ into the forecast. Allowing for de-rated operation, the temperature observer module 72 predicts that at future time $t_3$ the temperature of the component will reach an extended alarm threshold temperature $T_{EA}$, at which point the production controller 60 will shut down the wind turbine.

As mentioned above, the temperature observer module 72 is able to control the auxiliary cooling systems 70 proactively to prevent an alarm event occurring, as will now be described with reference to FIG. 6.

Figure 6:
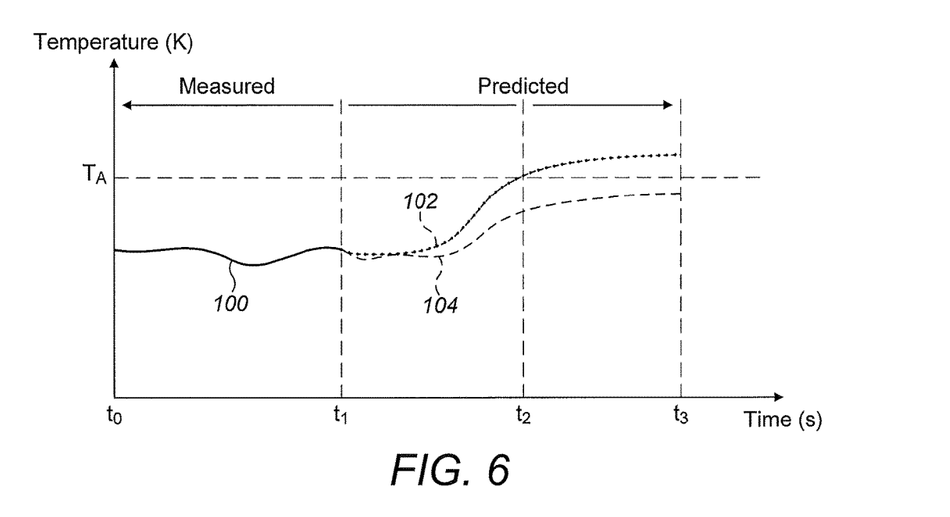
FIG. 6 is a plot showing the temperature evolution of the component when cooling is activated in advance to prevent the alarm event from being triggered.

Referring to FIG. 6, this shows two trajectories for the forecasted temperature evolution of the component. The first trajectory is indicated by the dotted line 102 and corresponds to the dotted line in FIG. 5 described above. The second trajectory is indicated by the dashed line 104, and represents the situation where cooling of the component is activated at time $t_1$ when the power boost is demanded. Referring first to the first trajectory 102 (i.e. without cooling activated) the temperature observer module 72 predicts that the alarm threshold temperature $T_A$, will be reached at time $t_2$, and will continue to rise thereafter between time $t_2$ and time $t_3$. Referring now to the second trajectory 104, the temperature observer module 72 predicts that if cooling is activated at time $t_1$, then the temperature of the component will still increase but will remain below the alarm threshold temperature $T_A$ at time $t_2$ and will stabilise at a level still below the alarm threshold temperature $T_A$ at time $t_3$.

Accordingly, by activating or otherwise controlling one or more auxiliary cooling systems 70 in advance of a predicted alarm event, the temperature observer module 72 is able to prevent the temperature of the component(s) from rising above the relevant alarm threshold temperature $T_A$ and therefore avoiding the need to de-rate or shut down the wind turbine. By forecasting the temperature evolution of the temperature-critical components, and pro-actively controlling the auxiliary cooling systems 70, the wind turbine is able to accommodate requests for a power boost even when the wind turbine is operating close to its maximum limits and in high ambient temperatures.

There now follows an explanation of the theory underpinning one of the temperature estimators, namely the gear oil temperature estimator, and an explanation of how the temperature observer module forecasts the temperature evolution based upon the estimated temperature values.

Referring again to FIG. 3, the gear oil temperature $T_O$ is affected by the temperature $T_B$ of the high speed bearing, by the flow and temperature $T_W$ of the cooling water through the heat exchanger, and by the temperature $T_N$ inside the nacelle. During operation of the wind turbine 10, heat is transferred from the rotating gears 26, 28 to the oil in the sump 38. The hot oil is then extracted from the sump and filtered before being pumped through the heat exchanger 42. The cooling water in the heat exchanger cools the oil and the cooled and filtered oil is pumped back into the gearbox 24 through the oil inlet 40.

To calculate the gear oil temperature $T_O$ an estimate of the total energy added to or removed from the gear oil has to be found. By using Newton's law of cooling, it is possible to calculate the heat transfer between two components with different temperatures using the following equation:

$$\frac{dQ}{dt} = h \cdot A \cdot (T_1 - T_2) \qquad \text{Equation 1}$$

Where Q is the lost heat flow (W), h is the heat transfer coefficient (W/m²K) A is the heat transfer surface area between the components (m²) and T1−T2 is the temperature difference between the components (K)

In the following calculations, a single constant, $K_{bearing}$ (W/K) is used as the constant for the energy transfer between the high speed bearing and the gear oil, where $$K_{bearing} = h \cdot A \qquad \text{Equation 2}$$

The energy transfer from the bearing to the gear oil is then calculated using the following equation:

$$Q = \int K_{bearing} \cdot (T_B - T_O) dt \qquad \text{Equation 3}$$

where $T_B$ is the temperature of the bearing and $T_O$ is the temperature of the gear oil.

The total energy transfer to the gear oil requires the subtraction of the energy transferred away from the gear oil to the air inside the nacelle and to the cooling water of the gearbox heat exchanger. Accordingly, the total energy transferred to the gear oil can be expressed using the following equation:

$$Q_{total} = \int (T_B - T_O) \cdot K_{bearing} dt - \int (T_O - T_N) \cdot K_{Nacelle} dt - \int (T_O - T_W) \cdot K_{cooling} dt \qquad \text{Equation 4}$$

where $T_N$ is the air temperature inside the nacelle, $T_W$ is the temperature of the cooling water of the heat exchanger, $K_{Nacelle}$ is the constant for heat transfer from the gear oil to the air inside the nacelle, and $K_{cooling}$ is the constant for heat transfer from the gear oil to the cooling water.

The temperature of the gear oil increases proportionally to the total energy added to the gear oil. Accordingly, the estimated temperature of the gear oil can be expressed by the following equation:

$$T_O = Q_{total} \cdot K_{oil} + T_{Oinit} \qquad \text{Equation 5}$$

Where $T_O$ is the estimated temperature of the gear oil; $K_{oil}$ is the constant of proportionality between the gear-oil temperature and the energy added to the gear oil; and $T_{Oinit}$ is the initial temperature of the gear oil.

Equation 5 above can be written in the form of a temperature predictor in the time domain as follows:

$$T_O(t + \Delta t) = T_O(t) + K_{oil} \left( \begin{array}{c} (T_B(t) - T_O(t)) \cdot e^{(-K_{bearing} \cdot \Delta t)} - (T_O(t) - T_N(t)) \cdot \\ e^{(-K_{Nacelle} \cdot \Delta t)} - (T_O(t) - T_W(t)) \cdot e^{(-K_{cooling} \cdot \Delta t)} \end{array} \right) \qquad \text{Equation 6}$$

Where t is the current time and $\Delta t$ is the prediction interval.

The next task is to determine the various heat constants, which requires an understanding of how the cooling system operates. In this example, the cooling system operates in three different modes depending on the gear oil temperature. In a first 'no cooling' mode, the fans are turned off and hence no auxiliary cooling of the water in the heat exchanger takes place. In a second low cooling' mode, the fans operate at a relatively low speed if the temperature of the gear oil reaches 55° C., and the fans turn off when the temperature of the gear oil drops to 47° C. In a third cooling mode, the fans operate at a relatively high speed when the temperature of the gear oil reaches 60° C., and the fans turn off when the temperature drops to 52° C.

This means that the constant $K_{cooling}$ will have three different values depending upon which mode the cooling system operates in.

Whilst the skilled person will appreciate that there are several ways to determine the different heat constants, a convenient method is to use logged data of $T_B$, $T_N$, $T_W$ and $T_O$ together with the discretised version of Equation 6 and a MATLAB script. The MATLAB script sweeps through different values of all the heat transfer constants and for every change in the constant it compares the gear oil temperatures calculated using Equation 6 with the measured temperature using the 'Least Square' method. The set of heat transfer constants that gives the minimum least square error between the estimated and measured data is then chosen.

Once the heat transfer constants are known, the temperature observer module 72 can forecast the temperature evolution of the gear oil using Equation 6 above. The forecast calculation assumes that the variables $T_B$, $T_N$ and $T_W$ remain constant during the prediction time interval $\Delta t$. The equilibrium temperature can be evaluated by calculating the time domain solution to the differential equation.

If a power boost is required by the control system at a future point in time, a new set point rotor speed is determined. The bearing temperature $T_B$ varies in proportion to the rotor speed, and the temperature observer module 72 accesses a look-up table that correlates the bearing temperature with rotor speed. This allows the temperature observer module 72 to forecast the temperature evolution of the gear oil when a power boost is required, as will now be explained further by way of example with reference to FIG. 7.

Figure 7:
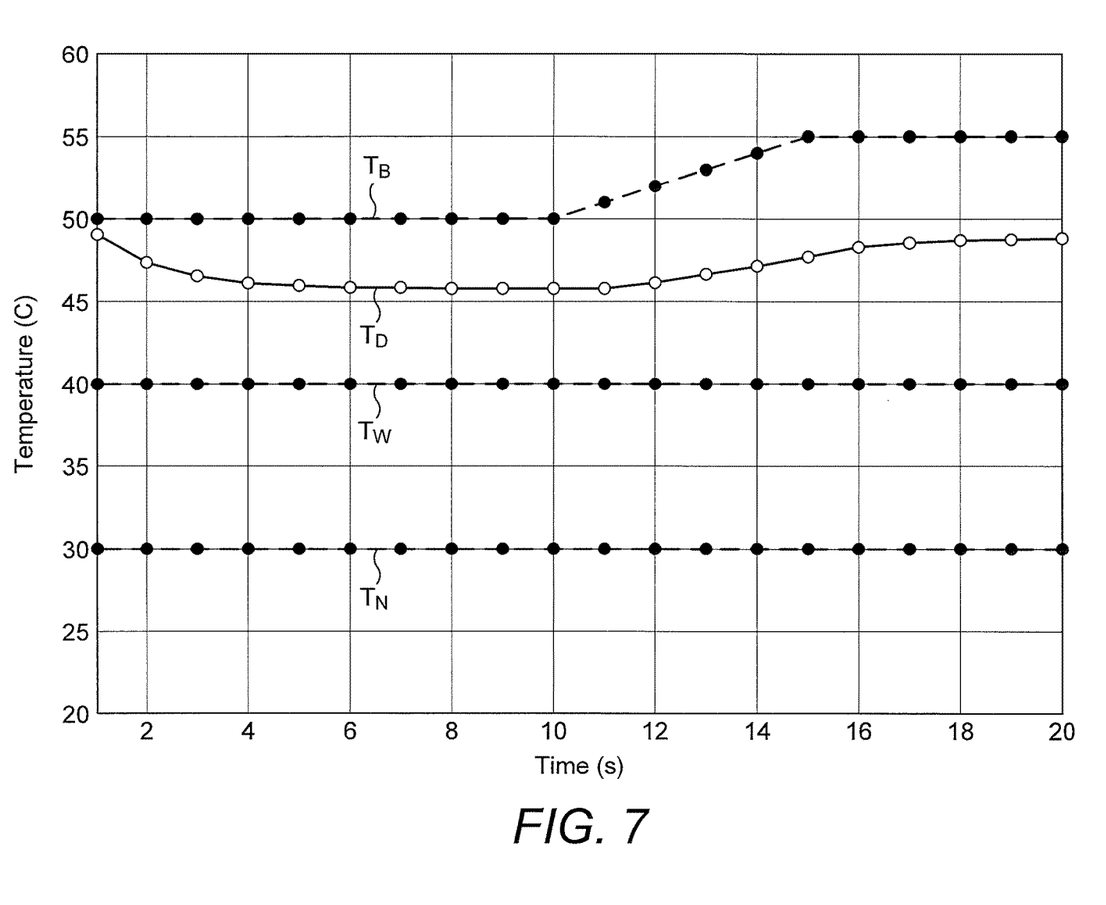
FIG. 7 is a simulated plot showing a temperature evolution forecast of the gear oil of a wind turbine when a power boost is demanded.

Referring to FIG. 7, this is a simulated plot showing the forecasted temperature evolution of the gear oil ($T_o$) calculated using Equation 6 above. The figure also includes plots of the forecasted temperature evolution of the high speed bearing ($T_B$), the cooling water ($T_W$) and the nacelle ($T_N$). The initial parameters are as follows:

$T_O(t)=49°$ C. (initial temperature of the gear oil sump)
$T_B=50°$ C. (initial temperature of the high speed bearing)
$T_N=30°$ C. (nacelle temperature)
$T_W=40°$ C. (water temperature)

Between time t=0 to t=10 seconds, the wind turbine is operating at a first set point rotor speed. The gear oil temperature $T_O$ falls from its initial value of 49° C. at t=0 to an equilibrium temperature of approximately 46° C. at approximately t=8 seconds. The forecast assumes that $T_N$ and $T_W$ remain constant for the duration of the forecast time period, which is twenty seconds in this example.

The temperature observer module 72 receives a signal from the production controller 60 that a power boost is required at t=10 seconds. The power boost will require the rotor speed to increase to a second set point level, which is higher than the first set point. The temperature observer module 72 determines from the look-up table the predicted temperature $T_B$ of the high speed bearing corresponding to the second set point rotor speed. The temperature observer module 72 also determines from previously logged data that the second set point rotor speed will be reached at approximately time t=15 seconds, and that the high speed bearing temperature $T_B$ rises linearly during this period. The temperature observer module 72 can then predict the temperature evolution of the gear oil based upon this predicted rise in temperature of the high speed bearing $T_B$. Accordingly, it is forecast that the gear oil temperature $T_O$ will rise steadily from about 46° C. at t=10 seconds, up to a new steady state temperature of approximately 48.5° C. at t=19 seconds.

It will be appreciated that the heat transfer constants will change in value if changes are made to the system, for example if the position of the sensors is changed or if the modes of operation of the cooling system are varied. To make the temperature forecaster more robust against 'real' measurements, standard approaches based on Kalman filters or equivalent methods can be utilised. In such cases, the current measurements may be used to update old predictions and to correct future predictions according to the new information about the system. Furthermore temperature predictors, due to the simple dynamics involved, can be built in the form of autoregressive equations, directly identified from measured data. Hence the predictors may be formulated using least square methods along with model order identification methodologies.

Various modifications may be made to the above examples without departing from the scope of the present invention as defined by the following claims.

What is claimed is:

1. A method of controlling a wind turbine, the method comprising:
   forecasting, using at least a first operating parameter of the wind turbine and a required power output of the wind turbine, a temperature evolution of a temperature of a component of the wind turbine;
   predicting, using the temperature evolution, a future alarm event caused by the temperature of the component exceeding a first threshold level or falling below a second threshold level; and
   while operating the wind turbine to provide the required power output, adjusting at least a second operating parameter of the wind turbine to control the temperature evolution to avoid or delay the predicted future alarm event,
   wherein adjusting the second operating parameter comprises operating an auxiliary heating system or an auxiliary cooling system of the wind turbine prior to the predicted future alarm event.

2. The method of claim 1, wherein adjusting the second operating parameter further comprises adjusting a rotor speed, a torque, or the power output of the wind turbine prior to the predicted future alarm event.

3. The method of claim 1, wherein forecasting the temperature evolution comprises:
   forecasting an effect of a demanded increase in the power output of the wind turbine upon the temperature evolution.

4. The method of claim 3, wherein forecasting the temperature evolution further comprises:
   forecasting an effect upon the temperature evolution of a first overrating strategy and a second overrating strategy for achieving the demanded increase in power, wherein the first overrating strategy comprises increasing a rotor speed of the wind turbine and the second overrating strategy comprises increasing a torque of the wind turbine; and selecting, between the first overrating strategy and the second overrating strategy, an overrating strategy that is less likely to result in the predicted future alarm event occurring.

5. The method of claim 3, further comprising:
determining, when the demanded increase in the power output is predicted to trigger the predicted future alarm event, a maximum overrated power at which the wind turbine can operate without triggering the predicted future alarm event, and
operating the wind turbine to output the maximum overrated power.

6. The method of claim 1, wherein the component comprises one of a gear oil, a hydraulic fluid, a converter, a cooling water system, and one or more generator phases.

7. The method of claim 1, wherein the first operating parameter of the wind turbine include measured temperature values.

8. The method of claim 1, wherein the first operating parameter include estimated temperature values.

9. The method of claim 1, wherein forecasting the temperature evolution is performed responsive to receiving an increased power demand.

10. The method of claim 1, wherein operating an auxiliary cooling system of the wind turbine comprises one of:
operating a water-cooled heat exchanger configured to cool gear oil; and
operating one or more fans to cool air within a nacelle of the wind turbine.

11. The method of claim 10, wherein operating the auxiliary cooling system comprises:
selecting, based on the temperature of the component, a cooling mode of a plurality of predefined cooling modes, wherein different cooling modes of the plurality of predefined cooling modes correspond to different temperature ranges; and
operating the auxiliary cooling system in the selected cooling mode.

12. The method of claim 11, wherein the different cooling modes correspond specify different rates of operating the auxiliary cooling system.

13. The method of claim 1, wherein the required power output corresponds to a rated power of the wind turbine, and wherein adjusting at least the second parameter to control the temperature evolution comprises avoiding de-rated operation of the wind turbine.

14. A wind turbine control system comprising:
a turbine controller configured to control operation of a plurality of components of a wind turbine; and
a temperature observer module configured to:
forecast, using at least a first operating parameter of the wind turbine and a required power output of the wind turbine, a temperature evolution of a temperature of a component of the plurality of components;
predict, using the temperature evolution, a future alarm event caused by the temperature of the component exceeding a first threshold level or falling below a second threshold level; and
while the turbine controller operates the wind turbine to provide the required power output, adjust at least a second operating parameter of the wind turbine to control the temperature evolution to avoid or delay the predicted future alarm event,
wherein adjusting the second operating parameter comprises operating an auxiliary heating system or an auxiliary cooling system of the wind turbine prior to the predicted future alarm event.

15. The wind turbine control system of claim 14, further comprising:
a production controller configured to determine, using one or more measured operating parameters of the wind turbine, a power reference and a speed reference, wherein the temperature observer module is further configured to:
receive information indicative of the temperature of the plurality of components; and
receive the power reference and the speed reference determined by the production controller.

16. The wind turbine control system of claim 14, wherein the temperature observer module is further configured to:
receive estimates of the temperatures of the plurality of components.

17. The wind turbine control system of claim 14, wherein adjusting the second operating parameter further comprises:
adjusting a rotor speed, a torque, or the power output of the wind turbine prior to the predicted future alarm event.

18. The wind turbine control system of claim 14, wherein forecasting the temperature evolution comprises:
forecasting an effect of a demanded increase in the power output of the wind turbine upon the temperature evolution.

19. The wind turbine control system of claim 18, wherein forecasting the temperature evolution further comprises:
forecasting an effect upon the temperature evolution of a first overrating strategy and a second overrating strategy for achieving the demanded increase in power, wherein the first overrating strategy comprises increasing a rotor speed of the wind turbine and the second overrating strategy comprises increasing a torque of the wind turbine; and
selecting an overrating strategy that is less likely to result in the predicted future alarm event occurring.

20. The wind turbine control system of claim 18, wherein the temperature observer module is further configured to:
determine, when the demanded increase in the power output is predicted to trigger the predicted future alarm event, a maximum overrated power at which the wind turbine can operate without triggering the predicted future alarm event, and
wherein the turbine controller is further configured to operate the wind turbine to output the maximum overrated power.

21. A wind turbine, comprising:
a tower;
a nacelle disposed on the tower;
one or more of an auxiliary heating system and an auxiliary cooling system; and
a wind turbine control system configured to:
forecast, using at least a first operating parameter of the wind turbine and a required power output of the wind turbine, a temperature evolution of a temperature of a component of a plurality of components of the wind turbine;
predict, using the temperature evolution, a future alarm event caused by the temperature of the component exceeding a first threshold level or falling below a second threshold level; and
while operating the wind turbine to provide the required power output, adjust at least a second operating parameter of the wind turbine, wherein adjusting the second operating parameter controls the temperature evolution to avoid or delay the predicted future alarm event, wherein adjusting the second operating parameter comprises operating the auxiliary heating system or the auxiliary cooling system prior to the predicted future alarm event.

22. A wind farm, comprising a plurality of wind turbines, at least one wind turbine of which comprises:
- a tower;
- a nacelle disposed on the tower;
- one or more of an auxiliary heating system and an auxiliary cooling system; and
- a wind turbine control system configured to:
  - forecast, using at least a first operating parameter of the wind turbine and a required power output of the wind turbine, a temperature evolution of a temperature of a component of a plurality of components of the wind turbine;
  - predict, using the temperature evolution, a future alarm event caused by the temperature of the component exceeding a first threshold level or falling below a second threshold level; and
  - while operating the wind turbine to provide the required power output, adjust at least a second operating parameter of the at least one wind turbine,
- wherein adjusting the second operating parameter controls the temperature evolution to avoid or delay the predicted alarm event,
- wherein adjusting the second operating parameter comprises operating the auxiliary heating system or the auxiliary cooling system prior to the predicted future alarm event.

* * * * *